INVENTORS
S. F. ARANYI
J. P. BARLOW
R. BARTON
L. L. RAKOCZI
M. A. TORFEH

BY Louis P. Elbinger

United States Patent Office 3,538,502

Patented Nov. 3, 1970

3,538,502

MULTIWORD STORAGE ACCESS CONTROL APPARATUS FOR A DATA PROCESSING SYSTEM

Steven F. Aranyi, Woburn, Mass., Jesse P. Barlow, Reseda, and Richard Barton, Santa Monica, Calif., Laszlo Leslie Rakoczi, Phoenix, Ariz., and Mark A. Torfeh, Tarzana, Calif., assignors to General Electric Company, a corporation of New York Continuation of application Ser. No. 508,168, Nov. 16, 1965. This application May 20, 1966, Ser. No. 551,657

Int. Cl. G06f *13/08*

U.S. Cl. 340—172.5 11 Claims

ABSTRACT OF THE DISCLOSURE

A data processing system is disclosed in which in response to a single instruction, a plurality of data words are transferred in rapid succession between a processor and a data storage member. To delimit the end of the transmission of one data word and to eliminate transient signals from the transmission member over which the data words are transmitted, the transmission member is momentarily disabled, after the transmission of each data word.

This invention relates to multicomputer systems and more particularly to apparatus for exercising management control of a multicomputer system.

A multicomputer system comprises a plurality of data processors, a plurality of data storage units, and a plurality of input devices and output devices. The data processors process data by executing separate programs or program parts simultaneously. The data storage units store data to be processed, data which is the result of processing, and programs for controlling the processing operations of the data processors. The input devices supply programs and data to be processed and the output devices receive and utilize processed data. Communication must be provided for the data processors to receive programs and data to be processed from the data storage units and to transmit processed data to the data storage units. In the multicomputer system described one or more input/output processors provide common control and data transmission centrals for a plurality of input devices and a plurality of output devices. Accordingly, communication must also be provided for the input/output processors to transfer programs and data to be processed to the data storage units from the input devices and to transfer processed data from the data storage units to the output devices.

The apparatus of the instant invention provides a portion of the management control for such a multicomputer system. Generally, management control of the multicomputer system described comprises expeditiously supplying data to be processed and the programs providing the required data processing functions to the data processors, and efficiently controlling the output devices to receive and utilize the processed data. Such management control is effected by providing and controlling all required communications between the processors and data storage units; by providing for the assignment of programs to data processors for execution in accordance with the required urgencies for execution of the different programs, the availability of the required input and output devices, the availability of the required data storage space in the data storage units, and the relative capabilities of the data processors for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the processors, or when the processors become partially or totally inoperative; etc.

Each data processor of a multicomputer system executes a program separately from the programs being executed by the other data processors. The program comprises a set of instructions, each instruction specifying a discrete type of processing operation. A data processor executes a program by sequentially responding to each of the instructions of the program to perform the corresponding operations. The data processor obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the instructions during execution require the data processor to further communicate with the data storage system, either to obtain a data item on which the data processor is to perform an operation or to store a data item which is the result of an operation. Accordingly, each instruction requiring the transfer of a data item between the data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

Each input/output processor of a multicomputer system performs control and data transmission operations for its respective set of input and output devices separately from the operations being performed by the other input/output processors and separately from the programs being executed by the data processors. An input/output processor controls the storage of the data items provided by each of its associated input devices in a respective set of cells of the data storage system. Thus, in transmitting the data items supplied in succession by a particular input device an input/output processor supplies in sequence addresses of the cells of a cell set for receiving and storing the data items. Similarly, data items for transmission to each of its associated output devices are obtained by the input/output processor from a repective set of cells of the data storage ssytem. Thus, in transmitting data items in succession to a particular output device an input/output processor also supplies in sequence addresses of the cells of the cell set storing the data items.

For convenience herein both data items and instructions are termed "data words."

For most efficient operation, the processors of the multicomputer system are provided the capability of requesting retrieval and receiving from the data storage system a specified plurality of data words in one operation. The processors are also capable of requesting storage in and supplying to the data storage system a specified plurality of data words in one operation. To operate in conformity with the processors, the data storage units of the multicomputer system are provided the facility of responding to single requests to retrieve from the storage cells thereof a specified number of data words and to supply these plural data words on output leads for transmittal to the requesting processor. The data storage units are also provided the facility of responding to single requests to receive on input leads the plural data words supplied by a processor and to insert these plural data words into respective storage cells.

In providing the management control functions effecting the transfer of plural data items and instructions between the processors and the data storage units of a multicomputer system, it is desirable to employ apparatus which effects the transfer functions as rapidly and efficiently as possible, yet is not unduly costly and complex. One manner by which relative economy and simplicity can be achieved is for such apparatus to transfer successively and rapidly between processors and data storage units the individual data words of multiple data word transfer operations.

Accordingly, there is described in the copending U.S. patent application Ser. No. 550,562 of S. F. Aranyi, J. P. Barlow, L. L. Rakoczi, and M. A. Torfeh, for Data Storage Access Control Apparatus for a Multicomputer System, filed May 16, 1966, and assigned to the assignee of the instant invention, a data word transmission member for transmitting but a single data word, the transmission member being allocated and coupled successively to each of the processor-data storage unit pairs requiring a data word transfer operation. During a multiple word data transfer operation, signal sets representing the plural data words are transferred in succession between the requesting processor and the data storage unit through the transmission member. When the plural data words are provided by a data storage unit, the data words are retrieved simultaneously from their respective cells in the data storage unit and are transferred sequentially to and through the transmission member to the requesting processor. When the plural data words are provided by the processor, the data words are supplied sequentially by the requesting processor and transferred sequentially to and through the transmission member to the data storage unit, the data storage unit assembling the data words as they are received and simultaneously inserting the plural data words into respective storage cells.

For most rapid operation of the system, the data word signal sets of the multiple word data transfer operation described above should be transmitted in sequence through the data word transmission member as rapidly as possible, in order that the transmission member can be freed quickly for allocation to the next requesting processor-data storage unit pair. However, the sequential transmission rate of data words is limited by the requirement that the receiving device must be able to clearly distinguish each arriving data word from the immediately preceding and immediately following data words. Accordingly, apparatus should be provided in the multicomputer system described to clearly delimit each data word transmitted in a multiple word data transfer operation from the other data words transmitted. The sequential transmission rate of data words is also limited because whenever the signal set representing a data word is transmitted through a data word transmission member, the effects of the signals of the set persist in the transmission member for some time after the data word has been accepted by the receiving device. These persistent effects tend to obscure and interfere with the signals of data words immediately following. Accordingly, apparatus also should be provided to prevent the persistent effects which follow transfer of a data word through the data transmission member from adversely affecting the next-transmitted data word during a multiple word data transfer operation.

Therefore, it is an object of this invention to provide improved management control apparatus for providing communication between the processors and data storage units of a multicomputer system.

Another object of this invention is to provide apparatus for enabling the rapid transmission of a succession of data words between the processors and data storage units of a data processing system.

Another object of this invention is to provide apparatus for effecting the rapid transmission of the data words of a multiple word data transfer operation over a single word transmission member.

Another object of this invention is to provide apparatus for clearly delimiting each data word of a succession of data words being rapidly transmitted between a processor and a data storage unit.

Another object of this invention is to provide apparatus for eliminating the persistent effects which follow transfer of each data word of a succession of data words being rapidly transmitted between a processor and a data storage unit.

The foregoing objects are achieved, according to the instant invention, by providing, in a multicomputer data processing system, storage access control apparatus for providing sequential transmission of the data words of a multiple word data transmission operation between a processor and a data storage unit through a single data word transmission member, wherein the storage access control apparatus momentarily disables the transmission member following the transfer therethrough of each of the data words. The storage access control apparatus is coupled to all data processors, all input/output processors, and all data storage units. The data word transmission member is selectively coupled to one of the data processors or input/output processors and one of the data storage units, under direction of the storage access control apparatus.

As each processor requires communication with the data storage system, it supplies to the storage access control apparatus request control signals denoting the type of operation requested of the data storage system. One of these control signals, termed herein a "plural word" signal, denotes whether a single data word or a plurality of data words is to be transmitted in the required operation. Another of the control signals, termed herein a "directional" signal, denotes whether the direction of transmission is to be from processor to data storage system or from data storage system to processor.

The storage access control apparatus responds to the request control signals to assign a data storage unit for communication with each requesting processor, to store a representation of each such assignment, and to generate a storage unit identification signal corresponding to each stored representation. For the storage unit identification signals generated, and under control of the corresponding directional signals, the storage access control apparatus sequentially couples the transmission member between the data storage units corresponding to the identification signals and the processors to which the particular data storage units have been assigned for communication. Each coupling of the transmission member is controlled to effect a data transfer operation between a data storage unit and a processor in the direction corresponding to the directional signal supplied by the processor. During each such coupling of the transmission member, a single data word or a specified plurality of data words are transmitted between the coupled data storage unit and processor according to the state of the corresponding plural word control signal. If the plural word signal denotes a multiple word transfer operation a plurality of data words is transmitted in succession between processor and data storage unit.

In accordance with the instant invention, during each coupling of the transmission member to a processor-data storage unit pair for a multiple word transfer operation, the storage access control apparatus momentarily disables the transmission member immediately following the transmission of each data word therethrough. This momentary disablement of the transmission member clearly delimits each of the successively transmitted data words from the immediately preceding and immediately following data words. Additionally, the momentary disablement eliminates the transmission member of the persistent effects which follow each data word transfer, thereby providing a clear medium of communication as the next data word transfer is initiated.

Certain portion of the apparatus herein disclosed are not of our invention, but are the inventions of:

J. P. Barlow, C. R. Jones, and J. L. Kerr, as defined by the claims of their application, Ser. No. 559,305, filed June 21, 1966;

W. W. Chu and N. R. Crain, as defined by the claims of their application, Ser. No. 559,497, filed June 22, 1966;

S. F. Aranyi, J. P. Barlow, E. J. Porcelli, L. L. Rakoczi, and M. A. Torfeh, as defined by the claims of their application, Ser. No. 568,343, filed July 27, 1966;

J. E. Belt, L. A. Hittel, and L. L. Rakoczi, as defined by the claims of their application, Ser. No. 612,560, filed Jan. 30, 1967;

J. P. Barlow, R. Barton, L. L. Rakoczi, and M. A. Torfeh, as defined by the claims of their application, Ser. No. 618,076, filed Feb. 23, 1967;

J. P. Barlow, R. Barton, E. J. Porcelli, L. L. Rakoczi, and M. A. Torfeh, as defined by the claims of their application, Ser. No. 619,377, filed Feb. 28, 1967;

S. F. Aranyi, J. P. Barlow, L. L. Rakoczi, L. A. Hittel, and M. A. Torfeh, as defined by the claims of their application, Ser. No. 623,284, filed Mar. 15, 1967; and J. R. Hudson, L. L. Rakoczi, and D. L. Sansbury, as defined by the claims of their application, Ser. No. 646,504 filed June 16, 1967; all such applications being assigned to the assignee of the present application.

DESCRIPTION OF DRAWINGS

The invention will be described with reference to the accompanying drawings, wherein.

Figure 1:
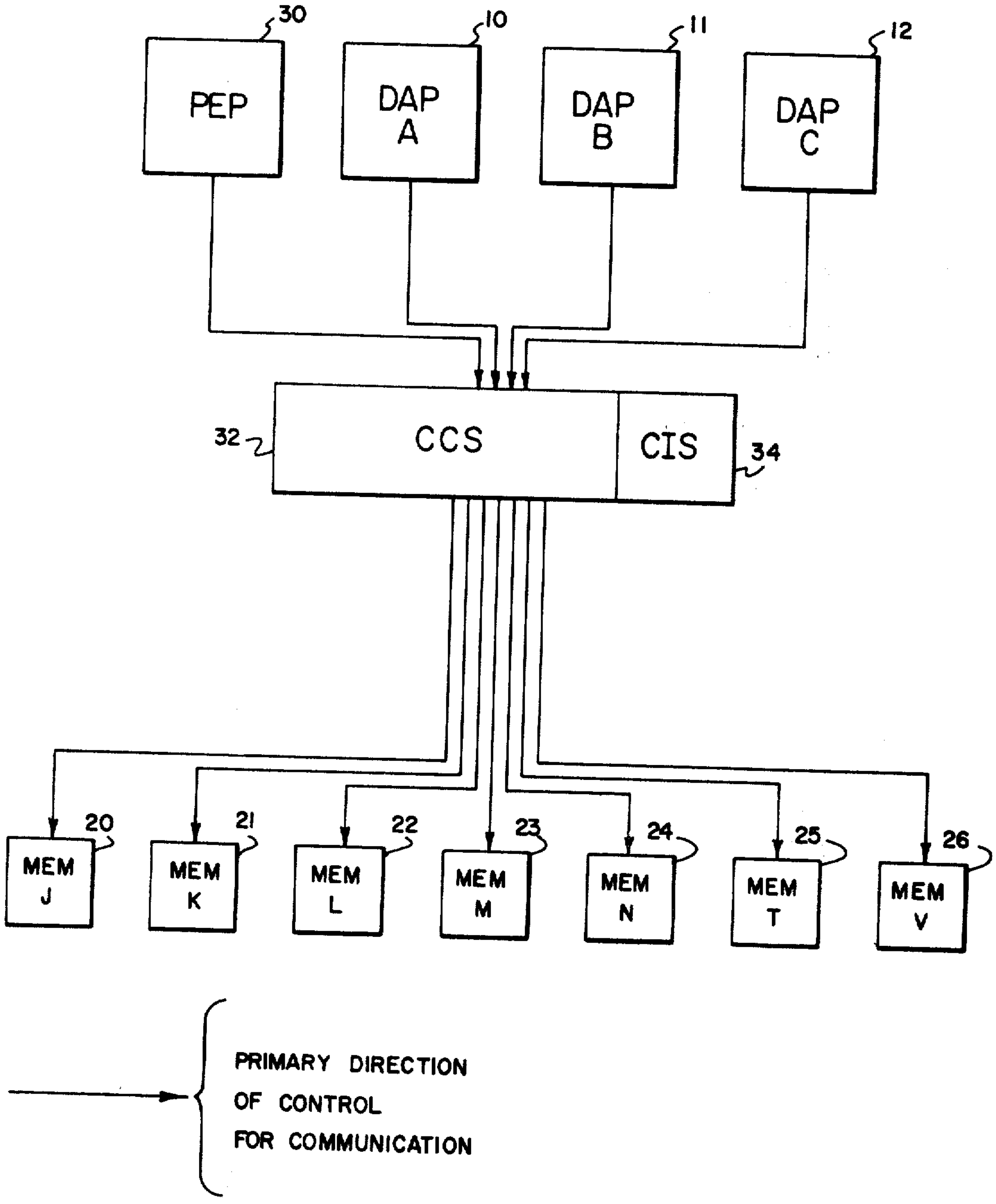
FIG. 1 is a block diagram of a Multicomputed Data Processing System to which the instant invention is applicable.

For a complete description of the system of FIG. 1 and of my invention, reference is made to U.S. patent application, Ser. No. 542,768, now Pat. No. 3,444,525, filed Apr. 15, 1966, entitled "Centrally Controlled Multicomputer System" by Jesse P. Barlow, Richard Barton, John E. Belt, Carlton R. Frasier, Lorenz A. Hittel, Laszlo L. Rakoczi, Mark A. Torfeh, and Jerome B. Weiner, and assigned to the assignee of the present invention. More particularly, attention is directed to FIGS. 2 through 110 of the drawings and to the specification beginning at page B–1, line 5, and ending at page N–64, line 16, inclusive of U.S. patent application, Ser. No. 542,768, which are incorporated herein by refeernce and made a part hereof as if fully set forth herein.

What is claimed is:

1. For employment with a processor and a data storage member, said processor being adapted to execute a sequence of operations for receiving and transmitting data words, said storage member storing a data word in each one of a plurality of storage cells, the combination comprising: a data word transmission member for transmitting one data word at a time between said processor and said storage member; said processor supplying a control signal when a plurality of data words is to be transferred between said processor and said storage member; means responsive to said control signal for coupling said transmission member to said processor and to said storage member; means further responsive to said control signal for transferring the data words of said plurality of data words in sequence between said processor and said storage member through said transmission member; and means enabled following the transfer of each of the data words of said plurality between said processor and said storage member for momentarily decoupling at least one of said processor and said storage member from said transmission member to clearly delimit the transmittal of each data word.

2. For employment with a processor and a data storage member, said processor being adapted to execute a sequence of operations for receiving and transmitting data words, said storage member storing a data word in each one of a plurality of storage cells, the combination comprising: a data word transmission member for transmitting a single data word at a time between said processor and said storage member; said processor supplying a control signal when a pair of data words is to be transferred between said processor and said storage member; means responsive to said control signal for coupling said transmission member to said processor and to said storage member; means further responsive to said control signal for transferring the data words of said pair of data words in succession between said processor and said storage member through said transmission member; and means enabled following the transfer of the first data word of said data word pair between said processor and said storage member for momentarily decoupling at least one of said processor and said storage member from said transmission member to clear the data word transmission member of transient signals following the transfer of each data word.

3. For employment with a processor and a data storage member, said processor being adapted to execute a sequence of operations for receiving and transmitting data words, said storage member storing a data word in each one of a plurality of storage cells, the combination comprising: a data word transmission member for transmitting one data word at a time between said processor and said member; means for supplying a control signal whenever in executing a single operation of a sequence of operations a plurality of data words is to be transferred between said processor and said storage member; means responsive to said control signal for coupling said transmission member to said processor and to said storage member; means further responsive to said control signal for transferring the data words of said plurality of data words in sequence between said processor and said storage member through said transmission member; and means enabled following the transfer of each of said data words of said plurality between said processor and said storage member for momentarily decoupling said processor and said storage member from said transmission member to clear the data word transmission member of transient signals followihg the transfer of each data word.

4. For employment with a processor and a data storage member, said processor being adapted to execute a sequence of operations for receiving and transmitting data words, said storage member storing a data word in each one of a plurality of storage cells, the combination comprising: a data word transmission member for transmitting a single data word at a time; control apparatus, normally enabled, for supplying a control signal when a plurality of data words is to be transferred between said processor and a storage cell of said storage member; means responsive to said control signal for coupling said transmission member to said processor and to said storage member; means further responsive to said control signal for transferring the data words of said plurality of data words in sequence between said processor and said storage member through said transmission member; and means enabled following the transfer of each of the data words of said plurality between said processor and said storage member for momentarily disabling said control apparatus, whereby said control signal is momentarily discontinued to delimit the transmittal of each data word of said plurality.

5. For employment with a processor and a data storage member, said processor being adapted to execute a sequence of operations for receiving and transmitting data words, said storage member storing a data word in each one of a plurality of storage cells, the combination comprising: a data word transmission member for transmitting one data word at a time; said processor, supplying, in executing one operation of a sequence of operations, a control signal when a plurality of data words is to be transferred between said processor and said storage member; means responsive to said control signal for coupling said transmission member to said processor and to said storage member; means further responsive to said control signal for transferring the data words of said plurality of data words in sequence between said processor and said storage member through said transmission member; and means enabled following the transfer of each of the data words of said plurality between said processor and said storage member for momentarily disabling said transmission member from transmitting a data word, to clear the data word transmission member of transient signals following the transference of each data word of said plurality.

6. For employment with a processor and a data storage member, said processor being adapted to execute a sequence of operations for receiving and transmitting data words, said storage member storing a data word in each one of a plurality of storage cells, the combination comprising: a data word transmission member for transmitting a single data word; means for supplying a control signal when a plurality of data words is to be transferred from said processor to said storage member; means responsive to said control signal for coupling said transmission member to said processor and to said storage member; means further responsive to said control signal for transferring the data words of said plurality of data words in sequence from said processor to said storage member through said transmission member; means further responsive to said control signal for initiating operation of said storage member to receive said sequentially transferred data words from said transmission member and to insert simultaneously all of said plurality of data words into respective ones of said cells; and means enabled following the transfer of each of said data words from said processor to said storage member for momentarily decoupling at least one of said processor and said storage member from said transmission member.

7. For employment with a processor and a data storage member, said processor being adapted to execute a sequence of operations for receiving and transmitting data words, said storage member storing a data word in each one of a plurality of storage cells, the combination comprising: a data word transmission member for transmitting a single data word; means for supplying a control signal when a plurality of data words is to be transferred from storage member to said processor; means responsive to said control signal for coupling said transmission member to said processor and to said storage member; means further responsive to said control signal for initiating operation of said storage member to retrieve simultaneously all of said plurality of data words from said cells and to transfer sequentially the data words of said plurality to said transmission member; means further responsive to said control signal for transferring the data words of said plurality of data words in sequence from said storage member to said processor through said tranmisssion member; and means following the transfer of each of said data words from said storage member to said processor for momentarily decoupling at least one of said processor and said storage member from said transmission member.

8. For employment with a plurality of processors and a plurality of data storage members, each of said processors being adapted to execute a sequence of operations for receiving and transmitting data words; the combination comprising: a selectively controllable data word transmission member; each of said processors being adapted to receive data words from said transmission member and to transfer data words to said transmission member, each of said processors supplying a request signal and a plural word signal when said processor requires communication with one of said storage members, a first state of said plural word signal denoting that a single data word is to be transmitted for said communication and a second state of said plural word signal denoting that a plurality of data words is to be transmitted for said communication; each of said storage members being adapted to receive data words from said transmission member and to transfer data words to said transmission member; a request storage member for receiving said request signals, for storing representations of the data storage members assigned for communication to the processors supplying said request signals, and for delivering output signals corresponding to the stored representations; coupling means responsive to said output signals for sequentially coupling said transmission member to the data storage members corresponding to said output signals, said coupling means also coupling to said transmission member the one of said processors to which said data storage member is assigned for communication when said transmission member is coupled to a data storage member; transmission control means enabled by each coupling of said transmission member between one of said data storage members and one of said processors and responsive to the first state of the plural word signal supplied by the one of said processors coupled to said transmission member for controlling the transfer of a single data word through said transmission member and responsive to the second state of said plural word signal for controlling the sequential transfer of each of a plurality of data words through said transmission member; and means further responsive to the second state of said plural word signal for momentarily decoupling at least one of the one of said processors and the one of said storage members coupled to said transmission member between the times of transfer of each of said data words.

9. For employment with a plurality of processors and a plurality of data storage members, each of said processors being adapted to execute a sequence of operations for receiving and transmitting data words; the combination comprising: a selectively controllable data word transmission member for transmitting a single data word; each of said processors being adapted to receive data words from said transmission member and to transfer data words to said transmission member, each of said processors supplying a request signal, a plural word signal, and a control signal when said processor requires communication with one of said storage members, a first state of said plural word signal denoting that a single data word is to be transmitted for said communication and a second state of said plural word signal denoting that a plurality of data words is to be transmitted for said communication, said control signal denoting the required direction of said communication; each of said storage members being adapted to receive data words from said transmission member and to transfer data words to said transmission member; a request storage member for receiving said request signals, for storing representations of the data storage members assigned for communication to the processors supplying said request signals, and for delivering output signals corresponding to the stored representations; coupling means responsive to said output signals and to said control signals for sequentially coupling said transmission member to the data storage members corresponding to said output signals, said coupling means also coupling to said transmission member the one of said processors to which said data storage member is assigned for communication when said transmission member is coupled to a data storage member, the coupling of said transmission member to a data storage member and a processor providing for the transmission of data words in the direction represented by said control signal; transmission control means enabled by each coupling of said transmission member between one of said data storage members and one of said processors and responsive to the first state of the plural word signal supplied by the one of said processors coupled to said transmission member for controlling the transfer of a single data word through said transmission member and responsive to the second state of said plural word signal for controlling the sequential transfer of each of a plurality of data words through said transmission member; and means further responsive to the second state of said plural word signal for momentarily decoupling at least one of the one of said processors and the one of said storage members coupled to said transmission member between the times of transfer of each of said data words.

10. For employment with a plurality of processors and a plurality of data storage members, each of said processors being adapted to execute a sequence of operations for receiving and transmitting data words; the combination comprising: a selectively controllable data word transmission member for transmitting a single data word; each of said processors being adapted to transfer data words to said transmission member, each of said processors supplying a request signal and a plural word signal when said processor requires communication with one of said storage members, a first state of said plural word signal denoting that a single data word is to be transmitted for said communication and a second state of said plural word signal denoting that a plurality of data words is to be transmitted for said communication; each of said storage members being adapted to receive data words from said transmission member; a request storage member for receiving said request signals, for storing representations of the data storage members assigned for communication to the processors supplying said request signals, and for delivering output signals corresponding to the stored representations; coupling means responsive to said output signals for sequentially coupling said transmission member to the data storage members corresponding to said output signals, said coupling means also coupling to said transmission member the one of said processors to which said data storage member is assigned for communication when said transmission member is coupled to a data storage member; transmission control means enabled by each coupling of said transmission member between one of said data storage members and one of said processors and responsive to the first state of the plural word signal supplied by the one of said processors coupled to said transmission member for controlling the transfer of a single data word through said transmission member and responsive to the second state of said plural word signal for controlling the sequential transfer of each of a plurality of data words through said transmission member; storage control means further responsive to the first state of said plural word signal for initiating operation of the one of said storage members coupled to said transmission member to receive a single data word from said transmission member and to insert said single data word into one of said cells, said storage control means being responsive to the second state of said plural word signal for initiating operation of the one of said storage members coupled to said transmission member to receive sequentially transferred data words from said transmission member and to insert simultaneously all of said plurality of data words into respective ones of said cells; and means further responsive to the second state of said plural word signal for momentarily decoupling at least one of the one of said processors and the one of said storage members coupled to said transmission member between the times of transfer of each of said data words.

11. For employment with a plurality of processors and a plurality of data storage members, each of said processors being adapted to execute a sequence of operations for receiving and transmitting data words; the combination comprising: a selectively controllable data word transmission member for transmitting a single data word; each of said processors being adapted to receive data words from said transmission member, each of said processors supplying a request signal and a plural word signal when said processor requires communication with one of said storage members, a first state of said plural word signal denoting that a single data word is to be transmitted for said communication and a second state of said plural word signal denoting that a plurality of data words is to be transmitted for said communication; each of said storage members being adapted to transfer data words to said transmission member; a request storage member for receiving said request signals, for storing representations of the data storage members assigned for communication to the processors supplying said request signals, and for delivering output signals corresponding to the stored representations; coupling means responsive to said output signals for sequentially coupling said transmission member ot the data storage members corresponding to said output signals, said coupling means also coupling to said transmission member the one of said processors to which said data storage member is assigned for communication when said transmission member is coupled to a data storage member; transmission control means enabled by each coupling of said transmission member between one of said data storage members and one of said processors and responsive to the first state of the plural word signal supplied by the one of said processors coupled to said transmission member for controlling the transfer of a single data word through said transmission member and responsive to the second state of said plural word signal for controlling the sequential transfer of each of a plurality of data words through said transmission member; storage control means further responsive to the first state of said plural word signal for initiating operation of the one of said storage members coupled to said transmission member to retrieve a single data word from one of said cells and to transfer said single data word to said transmission member, said storage control means being responsive to the second state of said plural word signal for initiating operation of the one of said storage members coupled to said transmission member to retrieve simultaneously all of said plurality of data words from said cells and to transfer sequentially the data words of said plurality to said transmission member; and means further responsive to the second state of said plural word signal for momentarily decoupling at least one of the one of said processors and the one of said storage members coupled to said transmission member between the times of transfer of each of said data words.

References Cited

UNITED STATES PATENTS

| | | | |
|---|---|---|---|
| 3,200,380 | 8/1965 | MacDonald et al. | 340—172.5 |
| 3,215,987 | 11/1965 | Terzian | 340—172.5 |
| 3,226,687 | 12/1965 | Amdahl et al. | 340—172.5 |
| 3,312,945 | 4/1967 | Berezin et al. | 340—172.5 |

GARETH D. SHAW, Primary Examiner

R. F. CHAPURAN, Assistant Examiner